COMPUTER-AIDED GRAPHICAL ANALYSIS

Filed Oct. 27, 1965 3 Sheets-Sheet 1

INVENTORS
Donald E. Hart &
Edwin L. Jacks
BY
Thomas N. Young
ATTORNEY

Oct. 13, 1970 D. E. HART ET AL 3,534,396

COMPUTER-AIDED GRAPHICAL ANALYSIS

Filed Oct. 27, 1965 3 Sheets-Sheet 2

INVENTORS
Donald E. Hart &
Edwin L. Jacks
BY
Thomas N. Young
ATTORNEY

Oct. 13, 1970 D. E. HART ET AL 3,534,396

COMPUTER-AIDED GRAPHICAL ANALYSIS

Filed Oct. 27, 1965 3 Sheets-Sheet 3

INVENTORS
Donald E. Hart &
Edwin L. Jacks
Thomas N. Young
ATTORNEY

United States Patent Office 3,534,396

Patented Oct. 13, 1970

3,534,396

COMPUTER-AIDED GRAPHICAL ANALYSIS

Donald E. Hart, Rochester, and Edwin L. Jacks, Warren, Mich., assignors to General Motors Corporation, Detroit, Mich., a corporation of Delaware Filed Oct. 27, 1965, Ser. No. 505,350
Int. Cl. G06f *3/08;* G06k *15/20*
U.S. Cl. 235—61.6 12 Claims

ABSTRACT OF THE DISCLOSURE

A method of analyzing and further developing graphical information utilizing a digital computer. Information in a graphical form is translated into a form that can be accepted by a digital computer and is read into the computer in the translated form. The computer then translates the information into graphical form which can be viewed by an operator-designer who then modifies the graphical representation and feeds information into the computer in accordance with the modification or development of the information that is graphically displayed. When the operator-designer is satisfied with his design the computer contains a representation of this design and the computer is capable of supplying a representation of the final design then can be converted into various graphical forms such as a drawing.

This invention relates to graphical analysis and more particularly to a method for the design and analysis of graphical information such as the points, lines and surfaces which make up an automobile body, which method is carried out using a digital computer to receive, coordinate and display the information during the development thereof.

Typically, the complete design of contoured lines and surfaces such as those which make up an automobile body or a portion thereof is an evolutionary process involving many repetitious and time consuming procedures of which only a small percentage is truly creative. For example, an automobile body design may begin with a stylist's sketch of a suggested shape for the body and finishes with the construction of a body analog in the form of a fiber glass model from which dies are constructed. Between these two points lie such procedures as merging the stylist's suggested shape with principal dimensions and chassis design, introducing surface details, determining compatibility of new surface designs with existing portions, anticipating fabricating and engineering requirements, and weighing the esthetic and technical effect of design or shape modifications and compromises.

All of these procedures necessitate the generation of drawings of various size and detail, templates, and models as devices for communication between the personnel involved in this multi-step evolutionary process. Obviously, detailed step-by-step communication between persons as well as between an individual and his own creative imagination is necessary to progress in a coordinated manner. However, it is apparent that each step involving a transfer of technical or graphical information from one form to another or from one person to another presents an opportunity for inadvertent modification as well as time delays in preparing and reviewing graphical information in intermediate stages of the design process.

According to the present invention, the process of graphical analysis and design relating to contoured lines and surfaces such as found in an automobile body or portion thereof is carried out in a manner wherein the communication necessary to the successful evolutionary development of a surface design is provided through the appropriate input and output channels of a digital computer under the control of a human operator-designer having access to the analytical power of the computer via a design console. By this method, the information representing a surface such as a body panel may be inserted or read into a computer via an input channel and stored in mathematical form in the computer memory. Preliminary shape information may be supplemented with engineering information, such as dimensions, surface details, fabrication requirements and proposed modification, and the combination thereof may be displayed via an output channel for review and analysis at each intermediate point in the evolutionary design process. The completion of the computer aided design process yields an analog in the form of a mathematical model of the surface. This model is contained in the computer in digital form ready for translation into any of several desired forms via computer controlled mediums such as photographic equipment, numerically controlled milling machines and drafting machines.

The method of graphical surface design and analysis practiced in accordance with the present invention thus is capable of providing highly efficient and rapid evolution of a design by means of a communication procedure in which design information is graphically received and displayed but digitally manipulated. The invention as well as a specific means for putting it into effect may be best described with reference to an illustrative example, a description of which follows. This example is illustrated in the accompanying figures of which:

Figure 1:
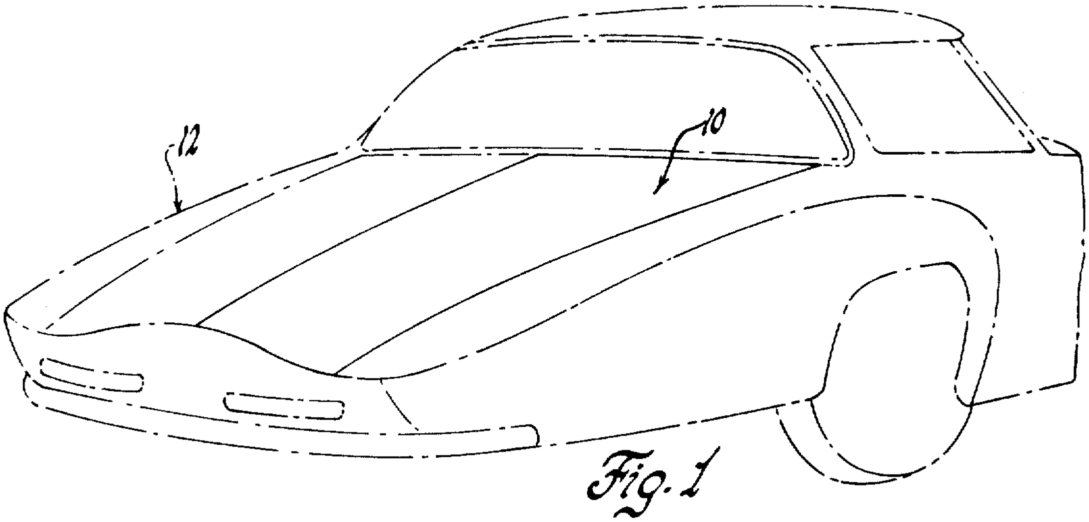
FIG. 1 is a stylist's sketch of a surface to be designed.

As previously indicated, a design process may be instituted by making a perspective drawing of a surface such as the rear deck 10 of an automobile 12 shown in FIG. 1 or by making a drawing of a boundary line thereof. This drawing contains suggested shape information with respect to the rear deck surface but may be devoid of exact dimensional or engineering detail including surface smoothing and sweetening, internal structure design, compatibility with surrounding surfaces, welding points and so forth.

Figure 2:
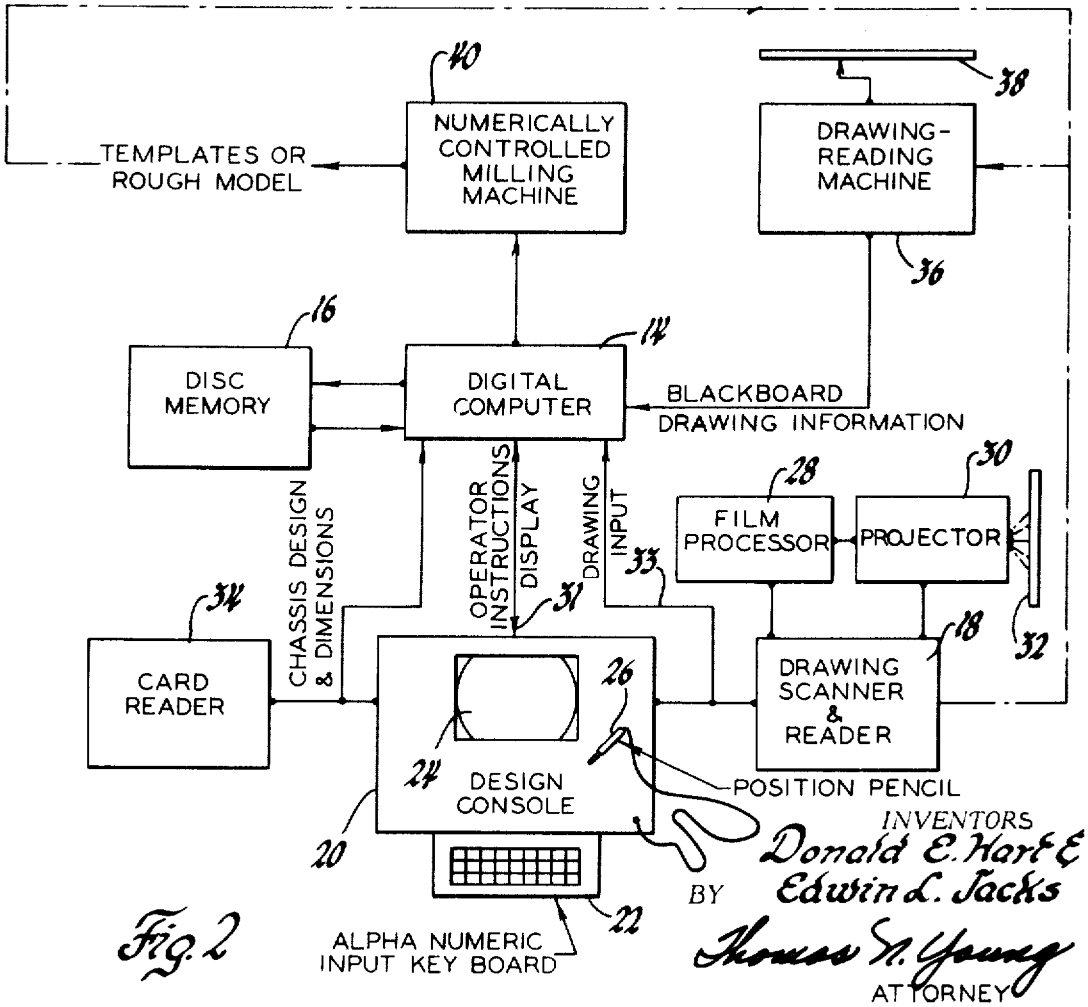
FIG. 2 is a block diagram of the apparatus used to carry out the invention.

For the purpose of evolving this preliminary drawing into a finished analog, a process involving the computer system shown in FIG. 2 is employed. This system centers about a digital computer 14 of the general purpose type such as the IBM 7094. The IBM 7094 has a relatively large random access memory suitable for the storage of graphical analysis information. As indicated in FIG. 2, the computer 14 may be supplemented with a very large auxiliary disc-type memory 16 suitable for the storage of auxiliary programs and data. It is to be understood that the computer 14 may vary in capacity and type depending on the complexity of the graphical analysis problems to be performed therein as well as the degree to which the computer may also be devoted to external computation of a type unrelated to graphical analysis work.

Preliminary design drawings may be entered into the computer 14 by way of a sketch reader 18 which is under the control of an operator-designer who communicates with the computer via a main design console 20. The sketch reader 18 may be of a type which first reduces the sketches to photographic form and then scans the photograph with cathode ray equipment as is further described in the following. The design console 20 provides the operator-designer with various communication modes with the computer 14. For example, the console 20 may be used to insert instructions as to the handling of the sketch received at 18 via a keyboard 22 and position indicating pencil 26 as well as to view the result as read by the computer via a cathode ray display screen 24. To reduce the input sketches to photographic form, the sketch reader 18 includes a film processor unit 28. Substantially immediate display of the design data placed on film by the processor unit 28 may be accomplished by the projector 30 and screen 32 combination which operates under the control of the design console 20 as a display facility parallel to the screen 24. The connections 31 and 33 between the console 20, sketch reader 18 and the computer 14 may constitute an IBM 7909 data channel.

Another input channel to computer 14 is provided by a card reader 34 which is operatively connected to the design console 20 so as to be under the control of the designer-operator. The card reader may be used either as an alternative or a supplement to the drawing reader 18. As an example, the card reader may receive specific numerical information such as engineering and dimensional data and place this data in the computer 14 for storage and combination with the graphical information received from drawing reader 18. Alternatively, a drawing or model may be digitized and placed on cards for insertion into computer 14. In this event, drawing reader 18 may not be used at all. The card reader may, for example, be an IBM Model 711, and connected to the computer 14 by an IBM 7607 data channel.

Another combination input-output channel for the computer-aided design system of FIG. 2 is provided by the drawing-reading machine 36. As further described below, this machine may include commercially available large-drawing digitizing apparatus to read so-called "blackboard drawings" 38 and insert a digital representation thereof into the computer 14. In the case of a full-size full-dimension drawing, the information received therefrom may not have to be supplemented with dimensional data from card reader 34. However, card reader 34 would nevertheless receive programmed instructions from the operator-designer. The drawing-reading machine 36 may also include a commercially available numerically controlled drafting machine or "plotter" capable of producing drawings such as 38 under the control of the computer 14. As such, the machine 36 provides another output channel for the computer 36 and thus a medium for transforming a design analog stored in computer 14 into an engineering drawing at any stage in the development of a surface design. As will be apparent to those skilled in the art, the drafting machine or plotter portion of 36 may be controlled by a tape produced by the computer 14.

As previously indicated, the final acceptance of a body surface design is typically accomplished on the basis of a full scale model which is constructed using templates taken from engineering drawings. According to the present invention, such a full scale model may be constructed by a direct translation of the mathematical model stored in the computer 14 into a three-dimensional physical model by way of a numerically controlled multi-axis milling machine 40. As shown in FIG. 2, the milling machine 40 is connected to be directly controlled by computer 14; however, it is understood that this connection may represent a punched tape computer output and milling machine input. Milling machine 40 may also be employed to cut templates, or may be employed to directly cut a full-dimensioned model from clay or other suitable material. Both three- and five-axis machines are suitable for use at 40, the latter being advantageous in reducing the amount of hand finishing required.

Summarizing the design procedure as applied to FIGS. 1 and 2, assume a perspective drawing of an automobile rear deck panel 10 or a curve representing a critical boundary or section thereof is to be graphically analyzed. This sketch is photographed and reduced to a standard size for scanning by sketch reader 18. The sketch is scanned under control of the operator-designer and digitized for storage in the computer 14. Alternatively, the original input to computer 14 may be pre-digitized, graphical information placed on punched cards and fed into card reader 34. An example of such an input may be a series of points plotted with respect to predetermined coordinate axes and defining the boundary of surface 10 which mates with the back light of the automobile 12. At this point an operator may call, through design console keyboard 22, for a display of the panel or line on screen 24. The graphical information displayed may be rotated to permit viewing from various angles or sections or perspectives. It may also be desirable to view an enlarged portion of the line or surface displayed to determine the roughness of the original input data. For example, if the data is taken from a clay model, an enlarged view may reveal points which are unacceptable in terms of dimensional tolerances. The operator-designer may call the computer's attention to the portion to be enlarged by touching the screen 24 with the position pencil 26 and giving computer 14 the proper command via keyboard 22. The operator-designer may then vary the contour of the panel 10 by weighing the effect of the four bounding lines thereof to finally arrive at a satisfactory design. Various other manipulations as may occur to the operator-designer may be performed at this time. For example, the boundary lines may be smoothed and sweetened or raised or lowered as necessary. The engineering and design information previously placed on cards may be inserted into computer 14 via card reader 34 and the combined result viewed on display screen 24. After evaluating various modifications to the resulting design, the designer may call for a large screen photographic display through projector 30 and screen 32. If this design is satisfactory, the mathematical model of the surface stored in the computer 14 may be directed to drawing-reading machine 36–38 for the production of final engineering drawings or to the milling machine 40 for the production of templates or a model. This output may be compared with original input drawings or used as a tool in communicating with other designers.

It can be seen that the method of graphical analysis and design described above provides a streamlined but careful evolutionary technique for proceeding from a simple sketch to a computer-stored analog of a finished surface from which analog a physical representation of the surface may be quickly and easily produced. Further, the developmental process is accomplished by an operator-designer at a single sitting in front of the design console 20 by which he communicates with the computer 14.

Figure 3:
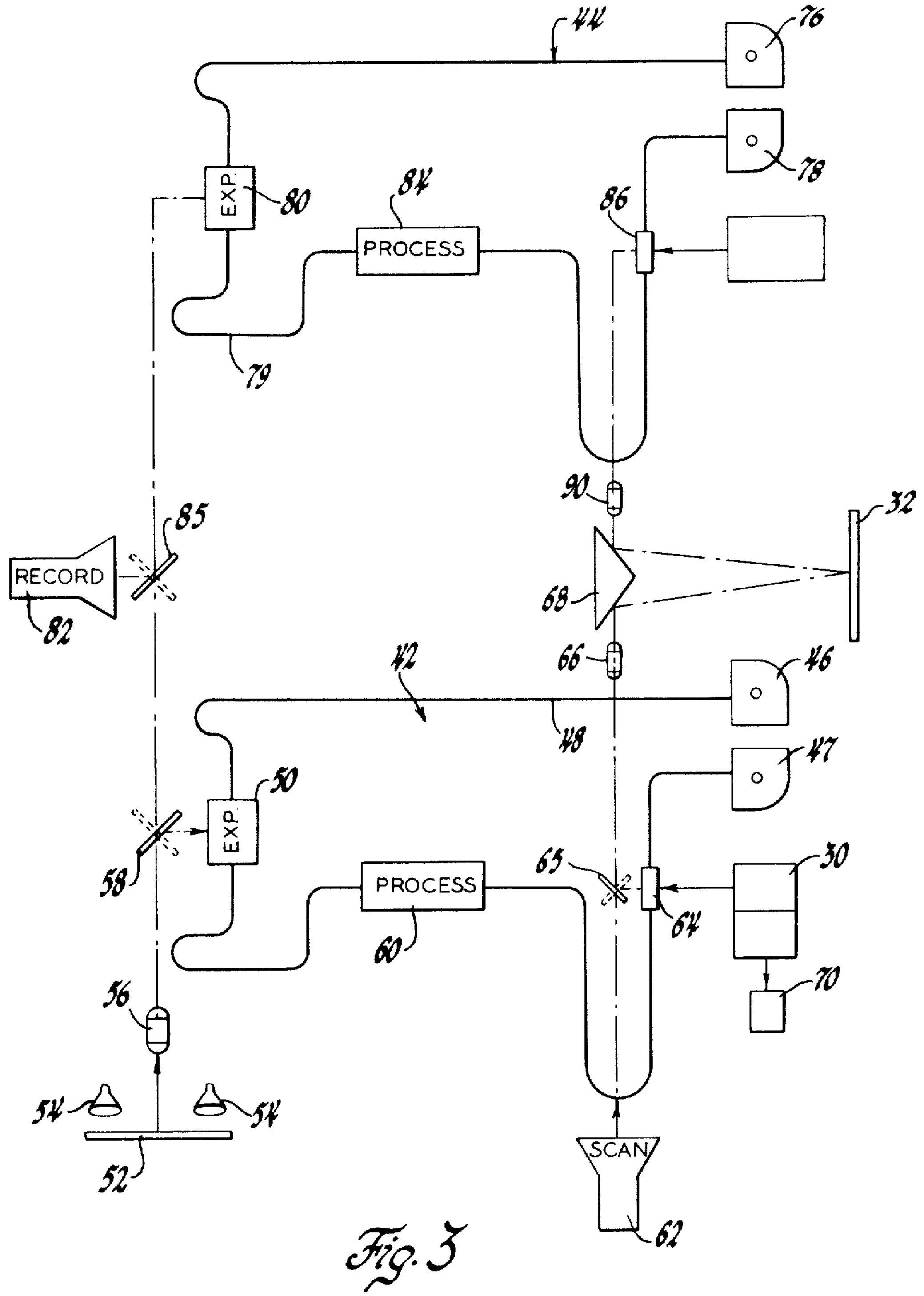
FIG. 3 is a schematic diagram of the photo processing portion of the apparatus shown in FIG. 2.

The primary details of the sketch scanner and reader 18, film processor 28 and projection unit 30–32 of FIG. 2 are schematically illustrated in FIG. 3. Referring to FIG. 3, this portion of the system is shown to include two film transport assemblies 42 and 44. Each of the film transport assemblies 42 and 44 are designed to receive graphical data and place such data on film for further handling. Transport 42 includes a film supply cassette 46 from which film strip 48 may be taken and a take up cassette 47. Film from 46 may be passed through an expose station 50 at which point the film receives for photographing the original graphical input such as the sketch shown in FIG. 1. This input is provided by means of a paper input drawer 52 which is adapted to receive paper documents such as sketches, engineering drawings and graphs which must be converted by a scanning process into a form acceptable to the computer 14. The paper input is lighted by floodlights 54 and communicated to the expose station 50 by way of an optical path which includes a shutter 56 and a revolvable mirror 58. After being exposed, the film 48 is advanced through suitable loops to a process station 60 where the film may be rapidly processed and dried. The processed film may then be advanced to a position in front of a high resolution scanning CRT 62. This scanning CRT is programmed to scan the exposed film to convert the data thereon into machine readable form for storage in computer 14. The film 48 may also be advanced past a projection station 64 for immediate projection by means of projector 30, a rotatable mirror 65 and a shutter 66, and a prism 68 to the projection screen 32. Mirror 65 is rotatable so as to permit either projection of the exposed film onto screen 32 or scanning of the exposed film by the scanning CRT 62. It is to be noted that the scanning process also involves the use of a photomultiplier tube (PMT) 70.

The scanning process is controlled by the program in computer 14 and the operator-designer at console 20 and is performed by the scanning CRT 62 in combination with mirror 65 and photomultiplier tube 70. The beam of the CRT 62 may be scanned over the surface of the film and light from the CRT passes through the film and is intensity modulated by the dark and light areas of the image on the film. The modulated light is detected by the PMT 70 and the amplitude modulated signal is converted to digital information for storage in the memory of computer 14.

Referring now to transport loop 44 of FIG. 3, it can be seen that this loop also includes a supply reel 76 and a take-up reel 78. Film 79 from the supply reel 76 is passed through an expose station 80 which is similar to station 50 of the lower transport loop 42. At this point the film is exposed to the image appearing on the surface of a record CRT 82 which is used to present an image corresponding to the image contained by the computer 14. After exposure the film is advanced to a rapid film processing station 84 which again is similar to the processing station 60 of transport loop 42. The processed film may then be immediately projected at a projection station 86 onto screen 32. The projection apparatus includes a projector 30' and an optical path including a shutter 90 and another surface of the prism 68. It can be seen that the upper transport loop 44 is employed for the purpose of projecting for off-line evaluation any graphical information which is contained in the computer 14 and displayable by means of the record CRT 82. A rotatable mirror 85 determines which of the film transports is to receive the information presented on the surface of record CRT 82.

It will be noted from FIG. 3 that it is possible to project two images onto screen 32 at the same time, one image coming from film transport 42 and the other from film transport 44. This capability permits the comparison of two images and therefore of two elements of graphical information and also permits the production of a three-dimensional effect (stereo viewing) on screen 32. As will be appreciated by those skilled in the art, viewing of a highly esthetic three-dimensional curved surface such as an automobile body panel in three dimensions is highly desirable.

Figure 4:
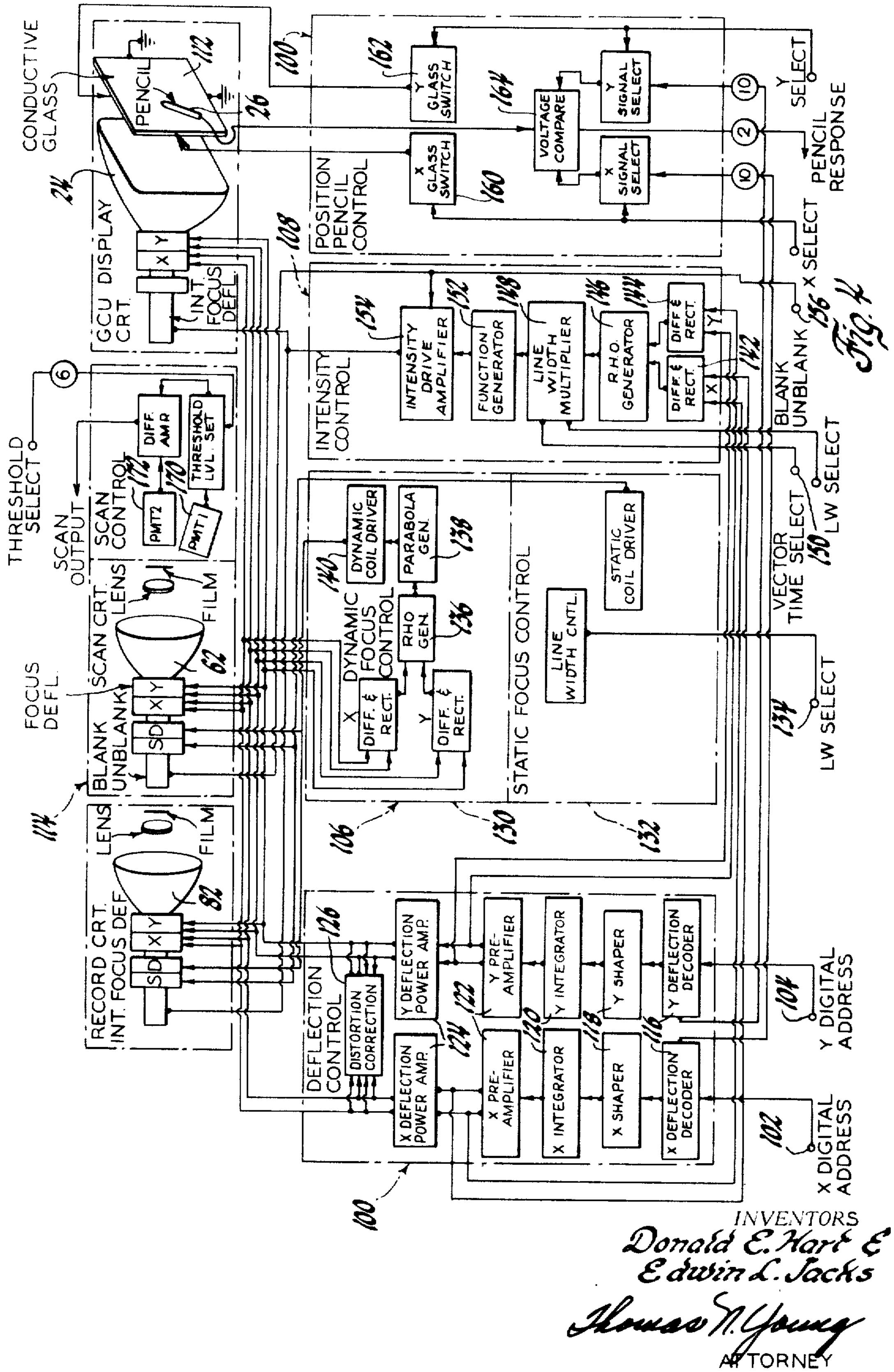
FIG. 4 is a schematic diagram of the scanning and digitizing portion of FIG. 2 apparatus.

A detailed illustration of the digital to analog conversion system which is contained in the design console 20 and the sketch scanner and reader 18 is shown in FIG. 4. Referring to FIG. 4, the analog system which controls the scan display and record CRT 62, 24 and 82, respectively, along the scan, detection, and position pencil 26 operation is shown in detail. As can be seen in FIG. 4, a single set of analog circuits is used to control all three of the CRT's. Switching between tubes is done with relays and is under the control of the computer 14.

The control circuit relating to the CRT's perform three basic functions. The deflection control system 100 precisely controls the position of the electron beam on the face of a given CRT as a result of a sequence of digital X, Y addresses supplied by the computer 14 through the data channel at 102 and 104. The focuse control 106 provides a uniform, round CRT beam over the entire usable area of the flat face record and scan CRT's 82 and 62, respectively. Without this control the CRT beam would increase in size and become astigmatic as the beam position moved off axis. A further requirement of this control is to provide four program selectable line widths; that is, CRT beam sizes, for film recording. The intensity control 108 is required to maintain constant beam brightness in the system CRT's independently of the beam size and beam velocity.

The control 110 for the voltage pen 26, also called the position pen, shown in FIG. 2, allows the pen 26, when in contact with the conductive glass screen 112 of the display CRT 24, to be located by the computer such that the CRT beam appears at the particular location of the pen 26. The scan detection system 114 senses the light output of the scanner CRT 62 which is modulated by the film image being scanned and correlates the amount of light received at a particular time to a position of the film image. There may be, for example, sixty-four program selectable threshold levels representing image transmissivities from zero to one hundred percent.

Considering the deflection control system 100, this system is shown in block diagram in FIG. 4 to be identical for both the X and Y deflection channels 102 and 104, respectively. The main element of the X deflection, Y deflection control circuits are the 12-bit digital to analog converter or decoder 116, the waveform shaper 118, the integrating network 120, preamplifier 122, and the deflection yoke current amplifier 124. Another circuit which is common to both the X and Y channels is the distortion correction system 126 which provides deflection yoke current compensation to minimize pincushioning effects on the flat face record and scan CRT's 82, 62 respectively.

The decoders 116 convert the digital addresses received from the computer into an analog signal proportional to the twelve binary weighted bits. The output of the decoder 116 is a current level which remains constant until a new address is received from the computer. The output then changes in a step-like fashion to a new current level where it remains until still another address is received.

The decoder output is then fed into the waveform shaper network which converts the current steps into a voltage waveform. A futher requirement imposed by the scanning system is that the beam move between points that are linear with time. In order to achieve this objective it is necessary to generate a deflection waveform in which the change in current or voltage from one level to the next takes place in a constant time and at a linear rate. The shape of output when integrated provides such a waveform. The output of the integrator 120 is fed into a preamplifier 122 which provides an impedance match with the deflection yoke power amplifier 124 and also converts the single ended input signal into a push-pull output signal. The deflection yoke power amplifier provides the current into a high performance push-pull deflection yoke for driving the five-inch record and scan CRT's. The power amplifier drives a low performance push-pull deflection yoke when connected to the 17-inch display CRT 24.

FIG. 4 is also shown to include two separate focus control portions. These are a dynamic control portion 130 to compensate for beam defocusing as a function of beam position and a static control portion 132 to generate the correct size of the CRT beam as determined by the programmed line width selection 134. The dynamic focus control includes a rho generator 136 which produces a signal corresponding to the approximate vectorial addition of the X and Y deflection components referenced to the electrical geometric center of the CRT. The output of the rho generator is then fed into a parabola generator 138 which provides an increasingly large amount of compensating signal through the dynamic focus coil driver 140 as rho increases.

The static focus circuit produces the current required to provide four different spot sizes. It is static in the sense that for a given spot size the current in the static focus coil remains constant regardless of beam position. Each spot size provides different line widths for image recording of vectors.

Referring to the intensity control portion of FIG. 4, intensity compensation is required to maintain constant beam brightness in the CRT's. Two operating conditions account for this requirement—the beam sweep speed and the line width. This requirement for intensity compensation applies only to the record and display CRT and not to the scan CRT 62. The record CRT requires intensity compensation to provide an even exposure of the film and the display CRT to provide an evenly illuminated display. The beam velocity range of the scan CRT is restricted in only the basic line which is utilized; therefore, no compensation is required.

Dynamic beam intensity compensation is accomplished by determining the status of three variable quantities—vector length, line width and vector time. The length of each vector is determined by sampling the X, Y deflection signals, differentiating and rectifying these signals at 142 and 144 and then feeding them into a rho generator 146. The rho generator produces an output signal which is the approximate vectorial addition of the change in the X and Y deflection components. The output of the rho generator is thus a signal proportional to vector length or velocity. This signal is fed into a circuit called a line width multiplier 148 which is controlled by the status of two digital lines from the computer 14, which lines relate to the particular line width selected at any given time. Another input to this circuit is the vector time selection 150. The signal level as described above is further modified as a function of the vector time.

Since the CRT beam intensity is linearly proportional to the beam current, the intensity control circuit changes grid voltage to control this beam current. However, the CRT grid voltage to cathode current transfer characteristic is not linear. Therefore, it is necessary to provide a nonlinear function generator circuit 152 which compensates for the CRT characteristics such that the intensity compensating signal as derived from the line width multiplier provides a nonlinear grid voltage signal in such a way as to provide the proper level of beam current. The final block is the intensity drive amplifier 154 which is a gated amplifier controlled by the blank-unblank line 156 from the computer.

Continuing the description of FIG. 4 with particular reference to the operation of the indicating pencil 26, this control system allows the pencil, when in contact with a conductive glass screen 112 of the design console 20, to be located by the computer 14 to appear at the pencil location. By sampling at a high rate in comparison with the motion of the pencil, the position of the beam can be maintained under the pencil making it appear that the pencil traces an image on the CRT screen.

Referring to the block diagram, the conductive screen 112 may take the form of a piece of glass coated with a thin transparent layer of tin oxide and placed directly in front of the display CRT 24. A voltage is alternately applied to the screen through the X, Y glass switches 160, 162 causing a voltage gradient to develop on the screen which is oriented left to right for the X axis or top to bottom for the Y axis. The pencil when in contact with the screen will thus alternately detect a voltage which is proportional to the distance the pencil point is from the left side of the screen or the top of the screen. This voltage is fed into one side of the voltage comparator 164. The opposite side of the comparator is supplied with a signal alternately from the X and Y deflection decoder. A comparison is thus made at a given time of the X position of the pencil and the Y position of the CRT beam or the X position of the pencil and the X position of the CRT beam. The output of the comparator is two digital lines to the computer 14 which indicate that the pencil coincides with the CRT beam or is to the right or left or above or below the CRT beam, or finally that the pencil is not touching the conductive screen.

Describing the scanning operation, this is initiated by an unblanked or visible beam deflection or scan vector written on the scan CRT screen under program control.

Light produced by the sweeping beam is sensed by PMT's 1 and 2 also designated 170 and 172. PMT 1 receives light directly from the CRT screen and consequently receives light whenever the beam is sweeping. PMT 2 receives light from the CRT screen through the film image and therefore receives only light when the beam sweeps through the clear areas of the film.

The object of writing a scan vector is to intercept the lines on the film image that the beam sweeps. Assuming that the film image is composed of black lines on a clear background, beam light sensed by PMT 2 will be momentarily interrupted when the sweeping beam intercepts each line. Assuming that the film image is composed of clear lines on a black background, PMT 2 will sense light momentarily when the sweeping beam intercepts the clear lines. However, PMT 2 output depends on the relationships of beam speed, beam spot diameter and width of the intercepted line.

The means by which graphical information may be inserted into a computer for rapid computation with respect thereto along with input-output means for enabling an operator-designer to communicate with the computer and the computer to communicate with the O-D on a real time basis has now been described. Referring back to FIG. 1, let it be assumed that graphical data in card or drawing form is to be read into the computer 14 and analyzed by way of the various graphical channels under the control of the operator-designer at the console 20. In reading the sketch, the foregoing description makes it clear that the computer 14 deals not with the entire surface but rather only the lines which define the surface. These boundary lines may be interpreted as the lines of intersection of the surface 10 with four planes forming a rectangular enclosure. To digitize the continuous line information which defines each of the four boundary lines of the surface 10 and also to preclude the necessity of a prohibitively large number of points in the memory of the computer 14, each of the boundary lines is converted into a series of mathematical expressions such as cubic equations by means of a curve fitting process. These expressions are then stored in a computer rather than retaining the actual coordinates of the points sensed along the lines in the digitizing process. After having found, for example, three points on any one of the boundary lines, the cubic expressions which will ultimately define the boundaries of the surface may be derived by a curve fitting process utilizing the least squares technique as will be apparent to those skilled in the art.

By defining a three-dimensional surface in terms of the four boundary lines, it can readily be seen that any interior point on the surface 10 may be located and in fact changed in coordinates to determine the overall contour of the surface. Therefore, by weighing the effect of any one of the four boundary lines on the entire surface relative to the other lines, the interior contour of the surface may be changed and immediately viewed by way of the display screen 24.

It can be seen that the present invention provides man-to-computer and computer-to-man communication which greatly facilitates graphic analysis procedures such as those used in automotive and other product styling and engineering designs. As applied to what is traditionally regarded as styling, the invention provides for the original creating of graphic information in graphic form, such as a drawing. This graphic information in proposed form may then be transferred to mathematic informaton and read into a computer where mathematical manipulations may be quickly performed and the effects thereof displayed without delay to an operator-designer or stylist. The stylist may then insert additional mathematical information into the computer, which the computer then combines with the information already in storage, and display the combined result to the stylist in graphic form. Accordingly, the stylist is able to communicate with the machine using mathematical information and the machine is able to communicate with the stylist in graphic terms. Having reached a satisfactory result from the styling standpoint, mathematical information stored in the computer may be translated into a graphic form of either two-dimension, such as a styling drawing, or three-dimension, such as a fiber glass model. To continue the analysis procedure for engineering design, body fabrication, die engineering, and other such advance purposes, the graphic information presented to the engineer by the stylist may be translated again into mathematical form and inserted into the computer for advanced analysis and development thereof. This advanced development employs a procedure which corresponds to that used by the stylist but which emphasizes additional detail, such as the dimensions of lines and surfaces, fabrication possibilities and so forth. In both cases, the operator-designer, either stylist or engineer, may make mathematical modifications to the stored information and receive information in graphic form regarding the effects of these modifications. Finally, when the mathematically stored information is in acceptable condition as graphically displayed, the stored mathematical model may be translated to a final analog form, such as drawings or a three-dimensional model.

It will be understood that the inventive design method described herein gives the designer or engineer a creative and analytical power heretofore unrealizable with conventional graphical communication techniques. While the method has been described without reference to specific hardware, it is to be understood that this description is illustrative in nature and that the invention is to be limited only by the appended claims.

We claim:

1. The method of analyzing and developing graphical information using a computer having input and output channels, the steps comprising, providing information in graphical form, translating the graphical information into a form which is capable of being accepted by a digital computer, reading the translated information into a digital computer via an input channel under the control of an operator-designer for processing in the computer, presenting the information to the operator-designer in graphical form via a graphical output channel of the computer, analyzing and modifying the information with instructions entered into the computer via an input channel, and storing the analyzed and developed graphical information in the computer for translation to an analog form on command from the operator-designer.

2. The method of analyzing and developing graphical information using a computer having input and output channels comprising the steps of translating the graphical information into a form which is capable of being accepted by a digital computer, reading the translated information into a digital computer via an input channel under the control of an operator-designer for processing in the computer, presenting the information to the operator-designer in graphical form via a graphical output channel of the computer, entering additional numerical information into the computer to modify the information representative of said graphical information, presenting the integrated sum of information in the computer to the operator-designer in graphical form via an output channel of the computer, and storing the sum of information stored in the computer in a form for translation to an analog form on command from an operator-designer.

3. The method defined in claim 12 comprising the additional step of translating the stored information into analog form via a computer output channel.

4. The method defined in claim 2 comprising the additional step of translating the stored information into a two-dimensional analog such as a drawing via a computer output channel.

5. The method defined in claim 2 comprising the additional step of translating the stored information into a three-dimensional analog such as a physical model via a computer output channel.

6. The method of analyzing and developing graphical information using a computer having input and output channels comprising the steps of producing a two-dimensional graphical representation of the information, scanning the two-dimensional representation to produce a mathematical representation thereof, reading the mathematical representation into a digital computer for processing via an input channel thereof, presenting the information to the operator-designer in graphical form via a graphical output channel of the computer, entering additional numerical information into the computer to modify the mathematical representation of said graphical information, presenting the integrated sum of mathematical information in the computer to the operator-designer in graphical form via an output channel of the computer, and storing the sum of information in the computer in mathematical form for translation to an analog form on command from an operator-designer.

7. The method defined in claim 6 comprising the additional step of translating the stored mathematical information into analog form via a computer output channel.

8. The method defined in claim 6 comprising the additional step of translating the stored mathematical information into a two-dimensional analog such as a drawing via a computer output channel.

9. The method defined in claim 6 comprising the additional step of translating the stored mathematical information into a three-dimensional analog such as a physical model via a computer output channel.

10. The method of analyzing and developing graphical information using a computer having input and output channels comprising the steps of producing a two-dimensional graphical representation of the information, scanning the two-dimensional representation to produce a mathematical representation thereof, reading the mathematical representation into a digital computer for processing via an input channel thereof, presenting the read information to the operator-designer in graphical form via a graphical output channel of the computer, entering additional mathematical information into the computer to modify the mathematical representation of said graphical information, presenting the integrated sum of read information to the operator-designer in graphical form via a graphical output channel of the computer, storing the sum of information in the computer in mathematical form for translation to an analog form on command from an operator-designer, and transferring the mathematical information to a numerically controlled drafting machine for production of a graphical drawing representing the mathematical information.

11. The method of analyzing and developing graphical information using a computer having input and output channels comprising the steps of producing a two-dimensional graphical representation of the information, scanning the two-dimensional representation to produce a mathematical representation thereof, reading the mathematical representation into a digital computer via an input channel thereof, presenting the read information to the operator-designer in graphical form via a graphical output channel of the computer, entering additional numerical information into the computer to modify the mathematical representation of said graphical information, storing the sum of information stored in the computer in mathematical form for translation to an analog form on command from an operator-designer, and transferring the mathematical information to a numerically controlled milling machine for production of a physical model representing the mathematical information.

12. A method of developing information indicative of a graphical representation for storage in a digital computer, the steps comprising, translating graphical information contained on a drawing into numerical information which is capable of being accepted by a digital computer, feeding said numerical information into said digital computer via an input channel of said computer, presenting said information to an operator-designer in a graphical form via a graphical output channel of the computer, modifying said graphical information by feeding additional instructions into said computer via an input channel to modify the numerical information originally fed into said computer and determining by said graphical output channel the extent of said modification, and storing the modified graphical information in the computer for translation to an analog form on command from the operator-designer.

References Cited

UNITED STATES PATENTS

| | | | |
|---|---|---|---|
| 3,037,192 | 5/1962 | Everett | 340—172.5 |
| 3,241,120 | 3/1966 | Amdahl | 340—172.5 |
| 3,305,841 | 2/1967 | Schwartz | 340—172.5 |
| 3,346,853 | 10/1967 | Koster et al. | 340—172.5 |

DARYL W. COOK, Primary Examiner

U.S. Cl. X.R.

340—172.5